(12) United States Patent
Yan et al.

(10) Patent No.: US 12,465,787 B2
(45) Date of Patent: Nov. 11, 2025

(54) RADIOTHERAPY MONITORING SYSTEM AND METHOD FOR CONTROLLING SAME

(71) Applicant: OUR UNITED CORPORATION, Xi'an (CN)

(72) Inventors: Hao Yan, Xi'an (CN); Tianchang Gou, Xi'an (CN); Jinsheng Li, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 533 days.

(21) Appl. No.: 17/935,265

(22) Filed: Sep. 26, 2022

(65) Prior Publication Data

US 2023/0099962 A1    Mar. 30, 2023

(30) Foreign Application Priority Data

Sep. 26, 2021   (CN) .......................... 202111130393.4

(51) Int. Cl.
*A61N 5/10*          (2006.01)

(52) U.S. Cl.
CPC ......... *A61N 5/1049* (2013.01); *A61N 5/1081* (2013.01); *A61N 2005/1059* (2013.01)

(58) Field of Classification Search
CPC ............... A61N 5/1049; A61N 5/1081; A61N 2005/1059; A61N 2005/1061; A61N 2005/1097
See application file for complete search history.

(56) References Cited

U.S. PATENT DOCUMENTS

| | | | | |
|---|---|---|---|---|
| 5,531,520 | A  * | 7/1996 | Grimson | A61B 90/13 |
| | | | | 382/294 |
| 5,622,187 | A  * | 4/1997 | Carol | A61N 5/1049 |
| | | | | 378/65 |
| 5,820,553 | A  * | 10/1998 | Hughes | A61B 6/08 |
| | | | | 378/65 |
| 6,405,072 | B1 * | 6/2002 | Cosman | A61B 90/16 |
| | | | | 606/130 |
| 9,789,338 | B1 * | 10/2017 | Tallhamer | A61N 5/1049 |
| 10,154,239 | B2 * | 12/2018 | Casas | G06F 3/011 |
| 10,716,956 | B2 * | 7/2020 | Chen | A61N 5/1081 |

(Continued)

FOREIGN PATENT DOCUMENTS

| | | |
|---|---|---|
| CN | 104888356 A | 9/2015 |
| CN | 107358607 A | 11/2017 |

(Continued)

OTHER PUBLICATIONS

China National Intellectual Property Administration, First Office Action in Chinese Patent Application No. 202111130393.4 issued on May 29, 2024, which is a foreign counterpart application corresponding to this U.S. Patent Application, to which this application claims priority.

*Primary Examiner* — David A Vanore
(74) *Attorney, Agent, or Firm* — Kolitch Romano Dascenzo Gates LLC

(57) ABSTRACT

A radiotherapy monitoring system, including radiotherapy equipment and one or more stereo cameras. A support apparatus included in the radiotherapy equipment carries a patient, and a first three-dimensional surface image of the patient is acquired by the one or more stereo cameras, such that the movement of the patient can be monitored based on the first three-dimensional surface image.

17 Claims, 8 Drawing Sheets

(56) References Cited

U.S. PATENT DOCUMENTS

| | | | | |
|---|---|---|---|---|
| 10,806,949 | B2* | 10/2020 | Li | A61N 5/1082 |
| 12,138,484 | B2* | 11/2024 | Gou | A61N 5/1075 |
| 2003/0133602 | A1* | 7/2003 | Bani-Hashemi | A61N 5/1049 |
| | | | | 382/131 |
| 2003/0225325 | A1* | 12/2003 | Kagermeier | A61N 5/1049 |
| | | | | 600/407 |
| 2009/0052760 | A1* | 2/2009 | Smith | G06T 7/593 |
| | | | | 382/132 |
| 2009/0187112 | A1* | 7/2009 | Meir | A61B 5/113 |
| | | | | 600/595 |
| 2009/0285357 | A1* | 11/2009 | Khamene | A61B 6/5217 |
| | | | | 378/207 |
| 2013/0006537 | A1* | 1/2013 | Vilsmeier | A61N 5/1038 |
| | | | | 702/56 |
| 2013/0289796 | A1* | 10/2013 | Bergfjord | A61N 5/1048 |
| | | | | 700/302 |
| 2015/0062303 | A1* | 3/2015 | Hanson | H04N 13/296 |
| | | | | 348/47 |
| 2015/0161793 | A1* | 6/2015 | Takahashi | A61N 5/1077 |
| | | | | 600/1 |
| 2015/0360054 | A1* | 12/2015 | Jeong | A61N 5/1049 |
| | | | | 600/1 |
| 2017/0112416 | A1* | 4/2017 | Hao | A61B 6/032 |
| 2017/0216626 | A1* | 8/2017 | Berlinger | A61N 5/1049 |
| 2018/0117359 | A1* | 5/2018 | Hale | A61N 5/1037 |
| 2018/0272153 | A1* | 9/2018 | Berlinger | A61N 5/1075 |
| 2019/0001155 | A1* | 1/2019 | Ohishi | A61N 5/103 |
| 2019/0321657 | A1* | 10/2019 | Hale | A61N 5/1075 |
| 2022/0079675 | A1* | 3/2022 | Lang | G02B 30/52 |
| 2023/0064516 | A1* | 3/2023 | Yan | G06T 7/337 |
| 2023/0102782 | A1* | 3/2023 | Yan | A61N 5/1049 |
| | | | | 600/1 |

FOREIGN PATENT DOCUMENTS

| | | |
|---|---|---|
| CN | 111870825 A | 11/2020 |
| CN | 113274654 A | 8/2021 |
| CN | 216855533 U | 7/2022 |
| IN | 230CH2013 A | 10/2015 |
| WO | 2021012149 A1 | 1/2021 |

* cited by examiner

RADIOTHERAPY MONITORING SYSTEM AND METHOD FOR CONTROLLING SAME

CROSS-REFERENCE TO RELATED APPLICATION

This application is based on and claims priority to Chinese Patent Application No. 202111130393.4, filed on Sep. 26, 2021, and entitled "RADIOTHERAPY MONITORING SYSTEM AND CONTROL METHOD THEREOF", the disclosure of which is herein incorporated by reference in its entirety.

TECHNICAL FIELD

The present disclosure relates to the field of medical technologies, and in particular, relates to a radiotherapy monitoring system and a method for controlling the radiotherapy monitoring system.

BACKGROUND

Radiotherapy is an important way to treat cancer, and radiotherapy equipment is the key medical equipment for radiation therapy.

SUMMARY

Embodiments of the present disclosure provide a radiotherapy monitoring system and a method for controlling the radiotherapy monitoring system. The technical solution is as follows.

According to some embodiments of the present disclosure, a radiotherapy monitoring system is provided. The system includes:
  radiotherapy equipment, wherein the radiotherapy equipment includes a support apparatus for carrying a patient and is provided with one or more isocenters; and
  one or more stereo cameras, wherein the one or more stereo cameras correspond to the one or more isocenters in a one-to-one correspondence, a shooting range of each stereo camera covers an isocenter corresponding to the stereo camera, and the one or more stereo cameras are configured to acquire three-dimensional surface images of the patient to monitor a movement of the patient based on the three-dimensional surface image.

In some embodiments, the radiotherapy equipment further includes a non-open gantry, the one or more isocenters include an actual isocenter disposed in the non-open gantry and a virtual isocenter that is disposed outside the non-open gantry and is disposed above a support surface of the support apparatus, and there is a preset position relationship between the virtual isocenter and the actual isocenter; and
  the one or more stereo cameras include a first stereo camera corresponding to the actual isocenter and a second stereo camera corresponding to the virtual isocenter, wherein a shooting direction of the first stereo camera faces an interior area of the non-open gantry, and a shooting range of the first stereo camera covers the actual isocenter, and a shooting direction of the second stereo camera faces the support surface of the support apparatus, and a shooting range of the second stereo camera covers the virtual isocenter.

In some embodiments, the first stereo camera is closer to the non-open gantry than the second stereo camera is.

In some embodiments, the first stereo camera is a short-focus stereo camera, and the second stereo camera is a long-focus stereo camera.

In some embodiments, the first stereo camera extends into the non-open gantry from a front end surface or a rear end surface of the non-open gantry, or the shooting direction of the first stereo camera faces a front end surface or a rear end surface of the non-open gantry; and
  the second stereo camera is disposed above or at a tail portion of the support apparatus.

In some embodiments, the first stereo camera is farther from the non-open gantry than the second stereo camera is.

In some embodiments, the first stereo camera and the second stereo camera are both long-focus stereo cameras.

In some embodiments, the radiotherapy monitoring system further includes a first connecting member connected to the first stereo camera and a second connecting member connected to the second stereo camera,
  where the first connecting member is arranged at a first reference position in a treatment room in which the radiotherapy equipment is disposed, the second connecting member is arranged at a second reference position in the treatment room, and the first reference position and the second reference position are the same positions or different positions.

In some embodiments, the first connecting member is a telescopic rod.

In some embodiments, the radiotherapy monitoring system further includes a fixed rod arranged in a reference plane in a treatment room in which the radiotherapy equipment is disposed, the fixed rod includes a first branch fixed rod and a second branch fixed rod, the first branch fixed rod faces the non-open gantry and is connected to the first stereo camera, and the second branch fixed rod faces the support apparatus and is connected to the second stereo camera.

In some embodiments, the radiotherapy equipment further includes an open gantry, and is provided with one isocenter; and
  the radiotherapy monitoring system includes one stereo camera corresponding to the isocenter, a shooting direction of the stereo camera facing a treatment area of the open gantry, and a shooting range of the stereo camera covering the isocenter.

In some embodiments, the radiotherapy monitoring system further includes a connecting rod with one end fixedly connected to the stereo camera, and the other end of the connecting rod is arranged in a reference plane in a treatment room in which the radiotherapy equipment is disposed.

In some embodiments, the radiotherapy monitoring system further includes a control apparatus connected to the one or more stereo cameras and the radiotherapy equipment.

According to some embodiments of the present disclosure, a method for controlling a radiotherapy monitoring system is provided, the method being applied to the foregoing radiotherapy monitoring system. The method includes:
  prior to treating the patient by radiotherapy equipment in the radiotherapy monitoring system, acquiring a first surface reference image of the patient by the one or more stereo cameras, and monitoring the movement of the patient based on the first surface reference image; and
  during the treating the patient by the radiotherapy equipment, acquiring a second surface reference image of the patient by the one or more stereo cameras, and monitoring the movement of the patient based on the second surface reference image.

In some embodiments, the method further includes: in response to receiving a user instruction for starting to monitor the movement of the patient, controlling the one or more stereo cameras to switch to a shooting started state; in response to receiving a user instruction for stopping monitoring of the movement of the patient, controlling the one or more stereo cameras to switch to a shooting stopped state; and in response to receiving a user instruction for pausing monitoring of the movement of the patient, controlling the one or more stereo cameras to switch to a shooting paused state.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

At present, prior to treating a patient by the radiotherapy equipment, the patient may be set up by an image guide radiation therapy (IGRT) system. During the treating the patient by the radiotherapy equipment, the position of the patient may also be monitored in real time by the IGRT system, to prevent a radiation beam emitted by the radiotherapy equipment from irradiating normal tissue of the patient. In practice, the IGRT system needs to acquire an image of a patient in real time by using imaging equipment such as computed tomography (CT) equipment or cone beam CT (CBCT) equipment. The imaging equipment needs to emit rays with radiation during imaging, and as a result the patient is exposed to a large amount of radiation.

Figure 1:
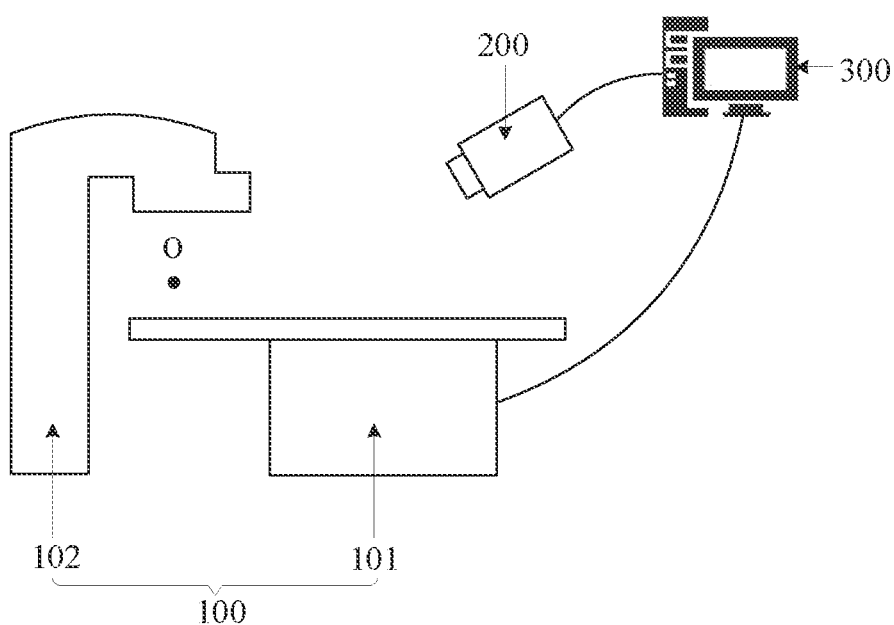
FIG. 1 is a schematic structural diagram of a radiotherapy monitoring system according to some embodiments of the present disclosure.

Referring to FIG. 1, FIG. 1 is a schematic structural diagram of a radiotherapy monitoring system according to some embodiments of the present disclosure. The radiotherapy monitoring system 000 includes radiotherapy equipment 100 and one or more stereo cameras 200.

The radiotherapy equipment 100 includes a support apparatus 101 for carrying a patient and is provided with one or more isocenters O.

In the embodiments of the present disclosure, the number of stereo cameras 200 in the radiotherapy monitoring system 000 is the same as the number of the isocenters O of the radiotherapy equipment 100. In addition, the one or more stereo cameras 200 correspond to the one or more isocenters O of the radiotherapy equipment 100 in a one-to-one correspondence. For example, one or two isocenters are provided in the radiotherapy equipment 100. Therefore, in the case that one isocenter is provided in the radiotherapy equipment 100, one stereo camera 200 is provided in the radiotherapy monitoring system 000. In the case that two isocenters are provided in the radiotherapy equipment 100, two stereo cameras 200 are provided in the radiotherapy monitoring system 000. In this way, at most two stereo cameras 200 are provided in the radiotherapy monitoring system 000, and the number of stereo cameras 200 in the radiotherapy monitoring system 000 is small, such that the manufacturing cost of the radiotherapy monitoring system 000 is low.

A shooting range of each stereo camera 200 covers an isocenter O corresponding to the stereo camera 200. The one or more stereo cameras 200 are configured to acquire a three-dimensional surface image of a patient, to monitor the movement of the patient based on the surface reference image.

In some embodiments, the one or more stereo cameras 200 are configured to acquire a first three-dimensional surface image of the patient prior to treating the patient by the radiotherapy equipment 100 to monitor the movement of the patient based on the first three-dimensional surface image.

In some embodiments, the one or more stereo cameras 200 are configured to acquire a second three-dimensional surface image of the patient during treating the patient by the radiotherapy equipment 100 to monitor the movement of the patient based on the second three-dimensional surface image.

In some embodiments, the one or more stereo cameras 200 are configured to acquire a first three-dimensional surface image of the patient prior to treating the patient by the radiotherapy equipment 100 and acquire a second three-dimensional surface image of the patient during the treating the patient by the radiotherapy equipment 100 to monitor the movement of the patient based on the first three-dimensional surface image and the second three-dimensional surface image.

In some embodiments of the present disclosure, the one or more stereo cameras 200 in the radiotherapy monitoring system 000 are all structured light cameras. After the patient is placed on the support apparatus 101, the one or more stereo cameras 200 emit structured light to the patient on the support apparatus 101, and receive structured light reflected by the surface of the patient, to allow the one or more stereo cameras 200 to acquire at least one of the first three-dimensional surface image or the second three-dimensional surface image of the patient.

In some embodiments, the radiotherapy monitoring system 000 further includes a control apparatus 300. The control apparatus 300 is one server or a server cluster formed by a plurality of servers or a cloud computing service center or a computer device such as a notebook computer or a desktop computer. In some embodiments of the present disclosure, the control apparatus 300 is in communication with each stereo camera 200 in the one or more stereo cameras 200, and the control apparatus 300 is further in communication with the radiotherapy equipment 100.

Prior to treating the patient by the radiotherapy equipment 100, the control apparatus 300 acquires the first three-dimensional surface image of the patient by the one or more stereo cameras 200. In this way, the control apparatus 300 controls the support apparatus 101 to move based on a relative position between the first three-dimensional surface image and a three-dimensional surface reference image, until a first deviation between the first three-dimensional surface image and the three-dimensional surface reference image after the movement falls within a preset threshold range, such that a target point of the patient is overlapped with the isocenter O of the radiotherapy equipment 100. In this way, a setup process of the patient can be completed, and subsequently, the patient is treated by the radiotherapy equipment 100. The three-dimensional surface reference image is a three-dimensional contour image of the surface of the patient in the case that the target point of the patient is overlapped with the isocenter O of the radiotherapy equipment 100. The radiotherapy equipment 100 in the foregoing embodiments is a gamma knife, a medical electron linear accelerator, or the like. The target point of the patient is a target of the patient.

During the treating the patient by the radiotherapy equipment 100, the control apparatus 300 acquires the second three-dimensional surface image of the patient by the one or more stereo cameras 200. In this way, the control apparatus 300 determines a second deviation between the second three-dimensional surface image of the patient and the three-dimensional surface reference image based on a relative position between the second three-dimensional surface image and the three-dimensional surface reference image. In the case that the control apparatus 300 determines that the second deviation exceeds the preset threshold range, the control apparatus 300 controls the support apparatus 101 to move based on the second deviation, until the second deviation after the movement falls within the preset threshold range, such that the target point of the patient is overlapped with the isocenter O of the radiotherapy equipment 100, thereby implementing the monitoring of the position of the patient and preventing a radiation beam emitted by the radiotherapy equipment 100 from irradiating normal tissue of the patient.

In summary, the radiotherapy monitoring system provided in the embodiments of the present disclosure includes radiotherapy equipment and one or more stereo cameras. Prior to treating a patient, a first three-dimensional surface image of the patient is acquired by the one or more stereo cameras, such that the movement of the patient can be monitored based on the first three-dimensional surface image in a process of controlling the movement of the patient by a support apparatus of the radiotherapy equipment, to implement the setup of the patient. After the setup of the patient is completed, during the treating the patient by the radiotherapy equipment, a second three-dimensional surface image of the patient is acquired by the one or more stereo cameras, such that the movement of the patient is monitored based on the second three-dimensional surface image, to prevent a radiation beam emitted by the radiotherapy equipment from irradiating normal tissue of the patient. The setup of the patient and the monitoring of the position of the patient can be implemented without using an IGRT system including imaging equipment such as CT or CBCT equipment. Because the stereo camera produces no radiation during operation, a patient is exposed to a small amount of radiation, to achieve a better treatment effect of the patient by the radiotherapy monitoring system. In addition, the number of stereo cameras in the radiotherapy monitoring system only needs to be the same as the number of isocenters of the radiotherapy equipment. Therefore, the number of stereo cameras in the radiotherapy monitoring system is small, and the manufacturing costs of the radiotherapy monitoring system are low.

In some embodiments of the present disclosure, as shown in FIG. 1, the radiotherapy equipment 100 in the radiotherapy monitoring system 000 further includes a rotating gantry 102 used for mounting a treatment head. The rotating gantry 102 is a non-open gantry or an open gantry. The non-open gantry includes a closed gantry such as a roller gantry surrounding a patient. The open gantry includes a non-closed gantry partially surrounding a patient. The open gantry may also be understood as another gantry different from a non-open gantry, for example, a C-shaped arm, a drum-shaped gantry or a robotic arm.

For rotating gantries 102 of different types, the overall architecture of the radiotherapy monitoring system 000 also varies. For this, the present disclosure is schematically described by the following two optional embodiments as examples.

Figure 2:
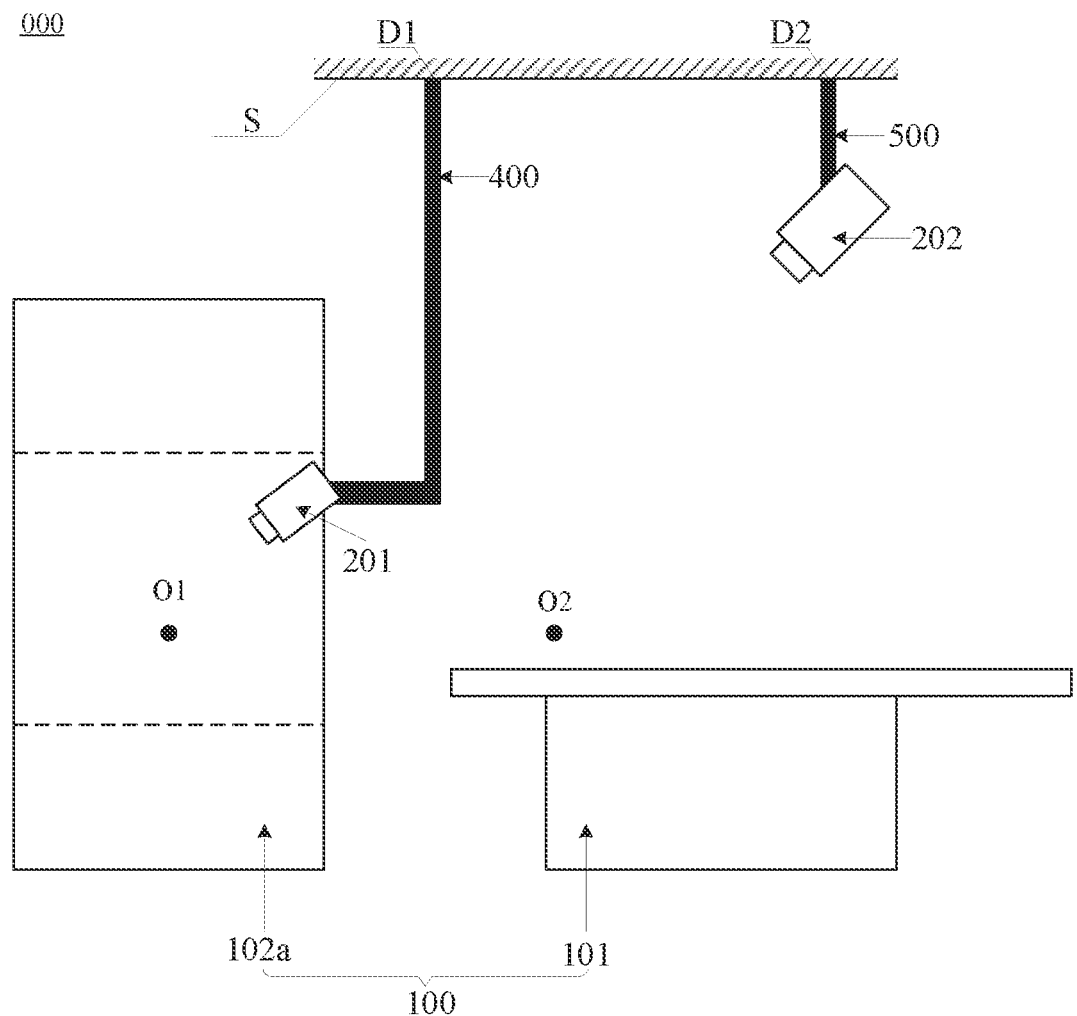
FIG. 2 is a schematic structural diagram of another radiotherapy monitoring system according to some embodiments of the present disclosure.

In the first optional embodiments, as shown in FIG. 2, FIG. 2 is a schematic structural diagram of another radiotherapy monitoring system according to some embodiments of the present disclosure. The rotating gantry in the radiotherapy equipment 100 is a non-open gantry 102a. One or more isocenters of the radiotherapy equipment 100 include an actual isocenter O1 disposed in the non-open gantry 102a and a virtual isocenter O2 that is disposed outside the non-open gantry 102a and is disposed above a support surface of the support apparatus 101. There is a preset position relationship between the virtual isocenter O2 and the actual isocenter O1.

In this case, two stereo cameras are provided in the radiotherapy monitoring system 000. The two stereo cameras are respectively a first stereo camera 201 and a second stereo camera 202. The first stereo camera 201 corresponds to the actual isocenter O1 of the radiotherapy equipment 100. A shooting direction of the first stereo camera 201 faces an interior area of the non-open gantry 102a, and a shooting range of the first stereo camera 201 covers the actual isocenter O1. The second stereo camera 202 corresponds to the virtual isocenter O2 of the radiotherapy equipment 100. A shooting direction of the second stereo camera 202 faces the support surface of the support apparatus 101, and a shooting range of the second stereo camera 202 covers the virtual isocenter O2.

In some embodiments of the present disclosure, in a setup phase of the patient, that is, before the radiotherapy equipment 100 treats the patient, the first three-dimensional surface image of the patient is acquired by the second stereo camera 202. In a process of controlling the movement of the patient by the support apparatus 101 of the radiotherapy equipment 100, the control apparatus monitors the movement of the patient based on the first three-dimensional surface image, until the target point of the patient after the movement is overlapped with the virtual isocenter O2 of the radiotherapy equipment 100, such that the setup process of the patient can be completed. After the setup of the patient is completed, the support apparatus 101 of the radiotherapy equipment 100 needs to move a preset distance based on a preset position relationship between the virtual isocenter O2 and the actual isocenter O1. In this way, the target point of the patient after the movement is overlapped with the actual isocenter O1 of the radiotherapy equipment. Subsequently, the patient is treated by the radiotherapy equipment 100.

In a treatment phase of the patient, that is, in a process of treating the patient by the radiotherapy equipment 100, a second three-dimensional surface image of the patient is acquired by the first stereo camera 201, and the control apparatus monitors the movement of the patient based on the second three-dimensional surface image, to prevent a radiation beam emitted by the radiotherapy equipment 100 from irradiating normal tissue of the patient.

In some embodiments of the present disclosure, when the radiotherapy monitoring system 000 includes the first stereo camera 201 and the second stereo camera 202, the first stereo camera 201 is closer to the non-open gantry 102a in the radiotherapy equipment 100 than the second stereo camera 202 is, or the second stereo camera 202 is closer to the non-open gantry 102a in the radiotherapy equipment 100 than the first stereo camera 201 is. For this, the present disclosure is schematically described by using the following two optional embodiments as examples.

In the first optional embodiments, as shown in FIG. 2, when the first stereo camera 201 is closer to the non-open gantry 102a in the radiotherapy equipment 100 than the second stereo camera 202 is, a distance between the first stereo camera 201 and the non-open gantry 102a is usually small. Therefore, to allow that the second surface reference image of the patient acquired by the first stereo camera 201 has high quality, it should be ensured that the working distance of the first stereo camera 201 is small. That is, the first stereo camera 201 is a short-focus camera.

The shooting direction of the second stereo camera 202 faces the support surface of the support apparatus 101. Therefore, in a process of moving the patient onto the support apparatus 101 or away from the support apparatus 101, there is a high probability that the patient collides with the second stereo camera 202. In order to reduce the probability that the patient collides with the second stereo camera 202, it should be ensured that a distance between the second stereo camera 202 and the support surface of the support apparatus 101 is large. In this way, a working distance of the second stereo camera 202 needs to be large. That is, the second stereo camera 202 is a long-focus camera, to ensure that the first surface reference image acquired by the second stereo camera 202 has high imaging quality.

It is needed to be noted that a short-focus camera or a long-focus camera usually is selected based on factors such as the size of a non-open gantry of actual radiotherapy equipment and the size of a treatment room. The long-focus camera is a stereo camera with a working distance greater than a first preset threshold, and the short-focus camera is a stereo camera with a working distance less than or equal to a second preset threshold. In some embodiments, the first preset threshold is not equal to the second preset threshold. For example, the first preset threshold is 0.5 meters, and the second preset threshold is 1.5 meters. In some embodiments, the first preset threshold is equal to the second preset threshold. For example, both the first preset threshold and the second preset threshold are 1 meter. That is, the working distance of the long-focus camera is greater than 1 meter, and the working distance of the short-focus camera is less than or equal to 1 meter.

Figure 3:
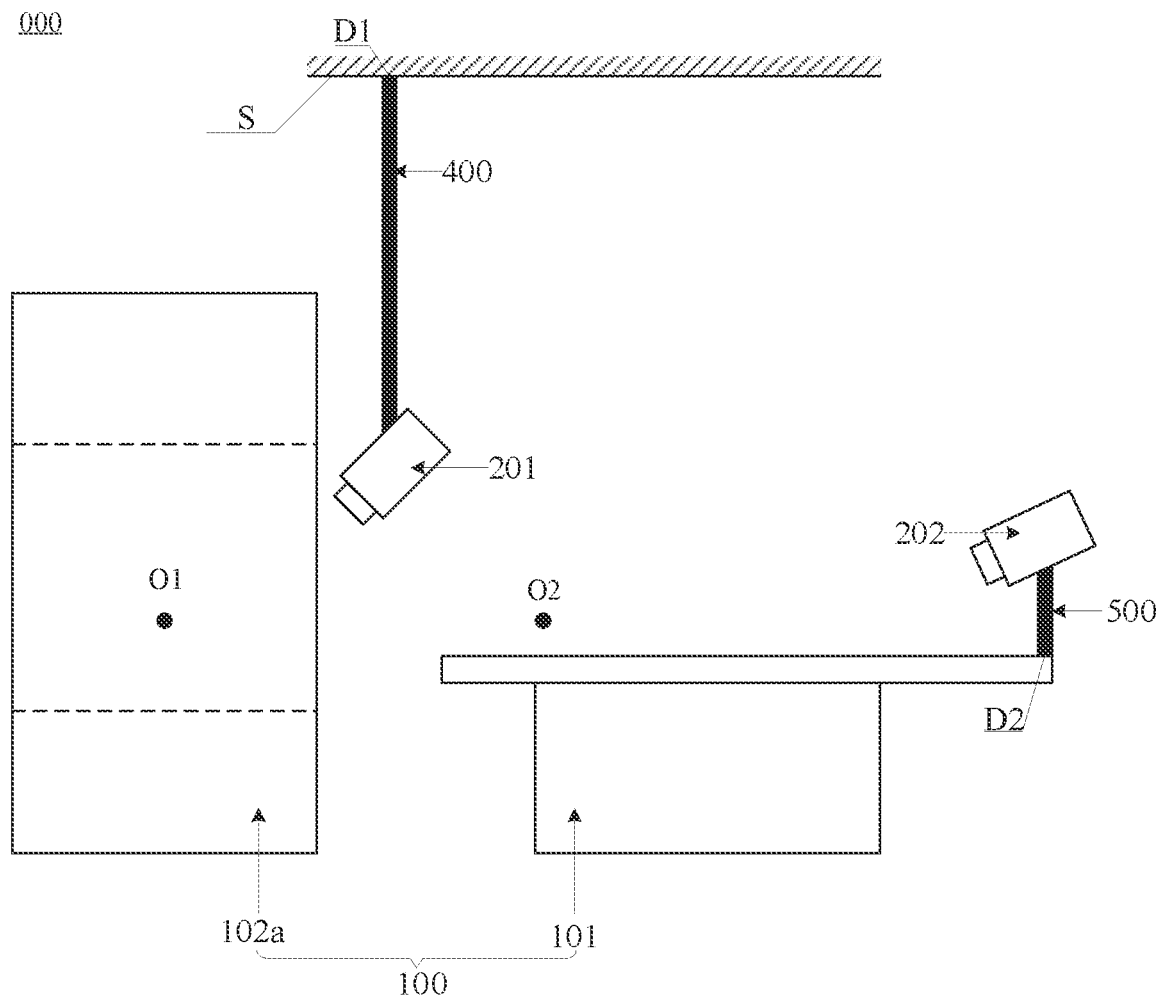
FIG. 3 is a schematic structural diagram of another radiotherapy monitoring system according to some embodiments of the present disclosure.

The first stereo camera 201 is arranged as follows. In one case, as shown in FIG. 2, the first stereo camera 201 is at least partially disposed in the non-open gantry 102a, and the first stereo camera 201 extends into the interior area of the non-open gantry 102a from a front end surface or a rear end surface of the non-open gantry 102a. In another case, as shown in FIG. 3, FIG. 3 is a schematic structural diagram of another radiotherapy monitoring system according to some embodiments of the present disclosure. The first stereo camera 201 is completely disposed outside the non-open gantry 102a. That is, the first stereo camera 201 is not extend into the interior area of the non-open gantry 102a. However, it should be ensured that the shooting direction of the first stereo camera 201 faces the front end surface or the rear end surface of the non-open gantry 102a. It can be ensured in both the cases that the shooting range of the first stereo camera 201 covers the actual isocenter O1 of the radiotherapy equipment 100.

The front end surface of the non-open gantry 102a is usually an end surface, proximal to the support apparatus 101, of the non-open gantry 102a, and the rear end surface of the non-open gantry 102a is usually an end surface, distal from the support apparatus 101, of the non-open gantry 102a. It should be noted that schematic description is provided in both FIG. 2 and FIG. 3 by taking an example in which the first stereo camera 201 performs shooting in a direction from the front end surface to the rear end surface of the non-open gantry 102a. A case in which the first stereo camera 201 performs shooting in a direction from the rear end surface to the front end surface of the non-open gantry 102a is not described in the drawings.

In some embodiments, the non-open gantry 102a in the radiotherapy equipment 100 is tightly attached to a wall of the treatment room in which the radiotherapy equipment 100 is disposed. In this case, to ensure that the shooting range of the first stereo camera 201 can cover the actual isocenter O1 of the radiotherapy equipment 100, it should be ensured that the first stereo camera 201 performs shooting in a direction from the front end surface to the rear end surface of the non-open gantry 102a.

In the embodiments of the present disclosure, when the first stereo camera 201 performs shooting in the direction from the front end surface to the rear end surface of the non-open gantry 102a, to reduce the probability that the patient collides with the first stereo camera 201 in a process of moving the patient onto the support apparatus 101 or away from the support apparatus 101, it should be ensured that when the support apparatus 101 is disposed outside the non-open gantry 102a, the first stereo camera 201 is disposed between the non-open gantry 102a and the support apparatus 101 in an axial direction of the non-open gantry 102a. In this case, both the process of moving the patient onto the support apparatus 101 and the process of moving the patient away from the support apparatus 101 are performed when the support apparatus 101 is disposed outside the non-open gantry 102a. For this, when the support apparatus 101 is disposed outside the non-open gantry 102a, if the first stereo camera 201 is disposed between the non-open gantry 102a and the support apparatus 101 in the axial direction of the non-open gantry 102a, there is a low probability that the patient collides with the second stereo camera 201 in the process of moving the patient onto the support apparatus 101 or away from the support apparatus 101.

The second stereo camera 202 is arranged as follows. In one case, as shown in FIG. 2, the second stereo camera 202 is disposed above the support apparatus 101 in the radiotherapy equipment 100. In this case, after the shooting direction of the second stereo camera 202 faces the support surface of the support apparatus 101, it can be ensured that the shooting range of the second stereo camera 202 covers the virtual isocenter O2 of the radiotherapy equipment 100.

In another case, as shown in FIG. 3, the second stereo camera 202 is disposed at a tail portion of the support apparatus 101 in the radiotherapy equipment 100. The tail portion of the support apparatus 101 is an end portion at an end, distal from the non-open gantry 102a, of the support apparatus 101. In this case, after the second stereo camera 202 faces a side of the support apparatus 101, it can be ensured that the shooting range of the second stereo camera 202 covers the virtual isocenter O2 of the radiotherapy equipment 100.

Figure 4:
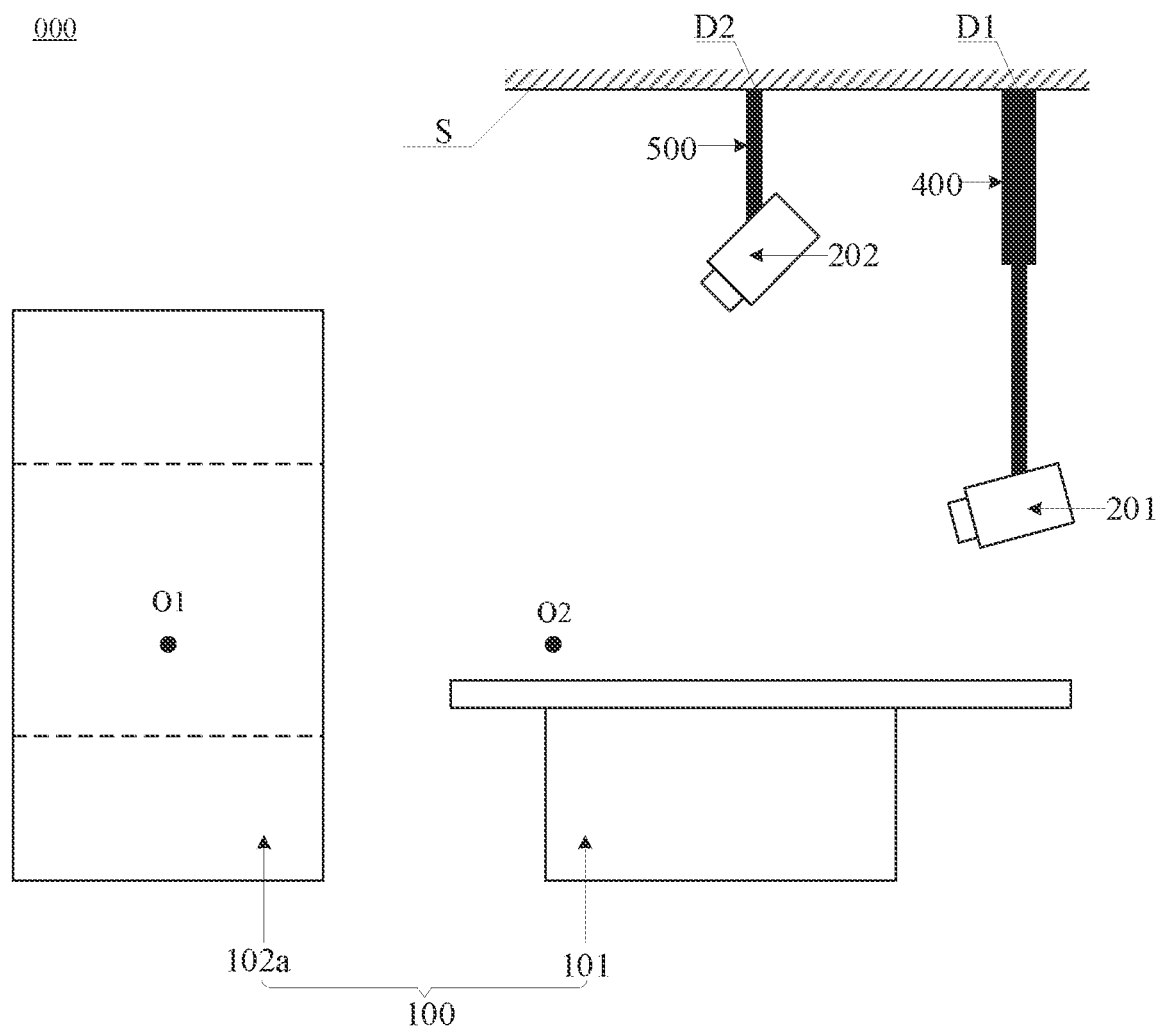
FIG. 4 is a schematic structural diagram of still another radiotherapy monitoring system according to some embodiments of the present disclosure.

In the second optional embodiments, as shown in FIG. 4, FIG. 4 is a schematic structural diagram of still another radiotherapy monitoring system according to some embodiments of the present disclosure. In the case that the second stereo camera 202 is closer to the non-open gantry 102a in the radiotherapy equipment 100 than the first stereo camera 201 is, the distance between the first stereo camera 201 and the non-open gantry 102a is large. Therefore, to allow that the second surface reference image of the patient acquired by the first stereo camera 201 has high quality, it should be ensured that the working distance of the first stereo camera 201 is large. That is, the first stereo camera 201 is a long-focus camera. For the structure and arrangement manner of the second stereo camera 202, reference may be made to the foregoing first optional embodiments, details are not described in the embodiments of the present disclosure. Therefore, the second stereo camera 202 is a long-focus camera.

In the foregoing first optional embodiments and second optional embodiments, both the first stereo camera 201 and the second stereo camera 202 need to be fixed by a connecting member. For example, as shown in FIG. 2 to FIG. 4, the radiotherapy monitoring system 000 further includes a first connecting member 400 connected to the first stereo camera 201 and a second connecting member 500 connected to the second stereo camera 202.

The first connecting member 400 is arranged at a first reference position D1 in a treatment room in which the radiotherapy equipment 100 is disposed, and the second connecting member 500 is arranged at a second reference position D2 in the treatment room in which the radiotherapy equipment 100 is disposed. In the embodiments of the present disclosure, the first reference position D1 and the second reference position D2 in the treatment room are the same positions or different positions. In this way, the first stereo camera 201 is fixed in the treatment room by the first connecting member 400, and the second connecting member 500 is fixed in the treatment room by the second stereo camera 202.

It should be noted that the drawings of the present disclosure are all exemplarily described with the first reference position D1 and the second reference position D2 being different positions. In addition, in FIG. 2 and FIG. 4, the first reference position D1 and the second reference position D2 are both disposed in a reference plane S in the treatment room. In FIG. 3, the first reference position D1 is disposed in the reference plane S in the treatment room, and the second reference position D2 is disposed at the tail portion of the support apparatus 101. The reference plane S is a plane in which the ceiling of the treatment room is disposed or is a support surface for fixing other apparatuses.

Optionally, for the first connecting member 400 in FIG. 2 and FIG. 3, the first stereo camera 201 to which the first connecting member 400 is connected is disposed between the non-open gantry 102a and the support apparatus 101 in the axial direction of the non-open gantry 102a. Therefore, in the process of moving the patient onto the support apparatus 101 or away from the support apparatus 101, there is a low probability that the patient collides with the second stereo camera 201. In some embodiments, the first connecting member 400 is a connecting rod with a fixed length. In some other embodiments, the first connecting member 400 is a telescopic rod with a variable length.

For the first connecting member 400 in FIG. 4, the inner diameter of the non-open gantry 102a in the radiotherapy equipment 100 is usually 1 meter. Therefore, to make the shooting direction of the first stereo camera 201 to which the first connecting member 400 is connected face the interior area of the non-open gantry 102a, the distance between the first stereo camera 201 and the support surface of the support apparatus 101 needs to be less than 1 meter. For example, the distance between the first stereo camera 201 and the support surface of the support apparatus 101 is approximately 0.5 meters. In this case, in the process of moving the patient onto the support apparatus 101 or away from the support apparatus 101, there is a very high probability that the patient collides with the first stereo camera 201. To reduce the probability that the patient collides with the first stereo camera 201, the first connecting member 400 to which the first stereo camera 201 is connected is a telescopic rod retractable in the length direction of the first connecting member 400.

Figure 5:
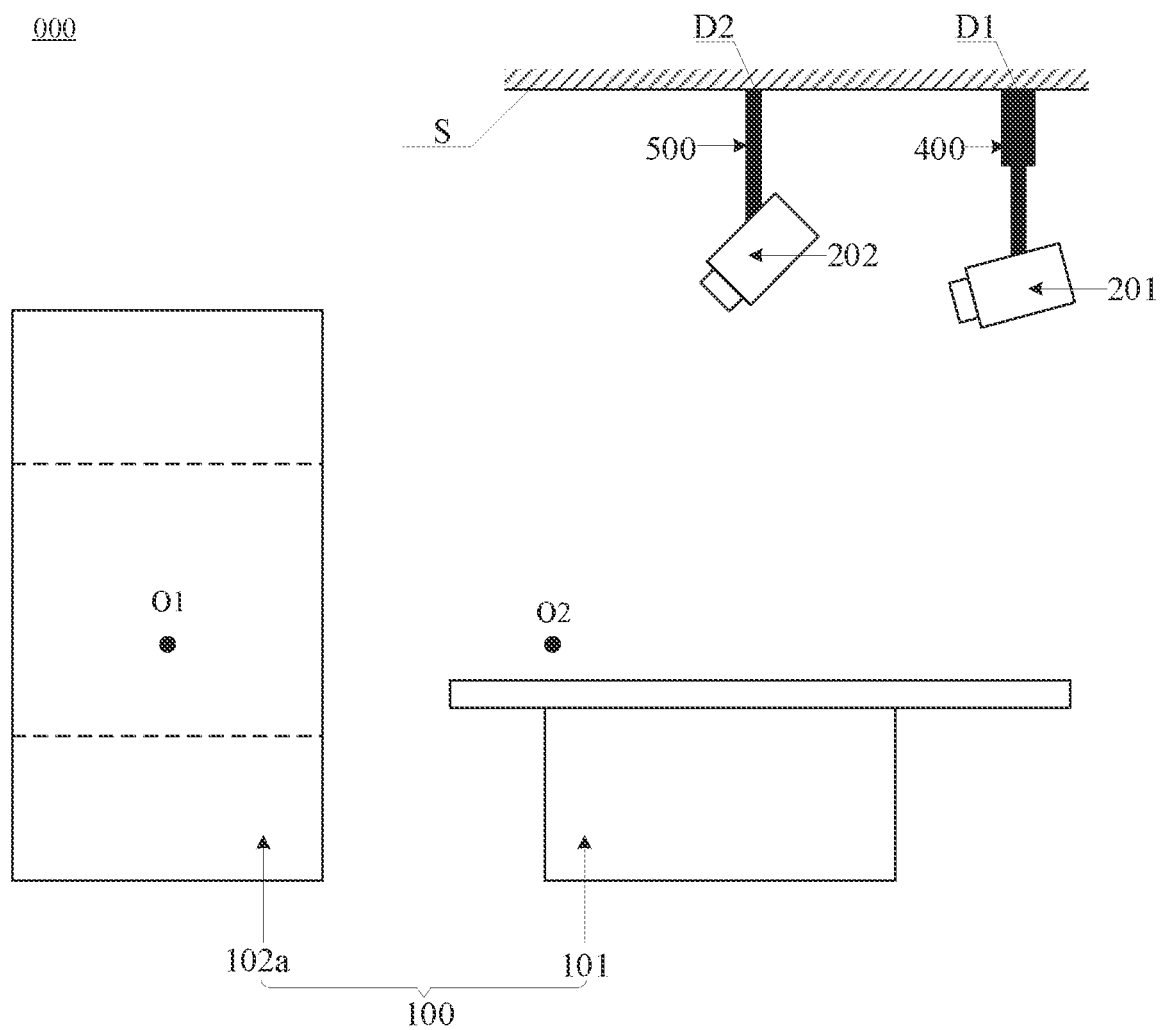
FIG. 5 is an effect diagram after a first connecting member in the radiotherapy monitoring system shown in FIG. 4 is retracted.

In this case, as shown in FIG. 5, FIG. 5 is an effect diagram after a first connecting member in the radiotherapy monitoring system shown in FIG. 4 is retracted. Before the patient is moved onto the support apparatus 101 or before the patient is moved away from the support apparatus 101, the first connecting member 400 retracts in the length direction of the first connecting member 400 to reduce the length of the first connecting member 400, to allow a large distance between the first stereo camera 201 and the support surface of the support apparatus 101. In this way, in the process of moving the patient onto the support apparatus 101 or away from the support apparatus 101, there is a low probability that the patient collides with the first stereo camera 201.

After the patient is moved onto the support apparatus 101, as shown in FIG. 4, the first connecting member 400 stretches in the length direction of the first connecting member 400 to increase the length of the first connecting member 400, to allow a small distance between the first stereo camera 201 and the support surface of the support apparatus 101. In this way, the shooting direction of the first stereo camera 201 faces the interior area of the non-open gantry 102a, to allow the shooting range of the first stereo camera 201 to cover the actual isocenter O1 of the radiotherapy equipment 100.

For the second connecting member 500 in FIG. 2 to FIG. 4, the distance between the second stereo camera 202 to which the second connecting member 500 is connected and the virtual isocenter O2 of the radiotherapy equipment 100 is large. Therefore, in the process of moving the patient onto the support apparatus 101 or away from the support apparatus 101, there is a low probability that the patient collides with the second stereo camera 202. In some embodiments, the second connecting member 500 is a connecting rod with a fixed length.

Optionally, when the first stereo camera 201 is closer to the non-open gantry 102a than the second stereo camera 202 is, in addition that the first stereo camera 201 and the second stereo camera 202 are respectively mounted in the treatment room by the first connecting member 400 and the second connecting member 500, in the embodiments of the present disclosure, the first stereo camera 201 and the second stereo camera 202 are mounted in the treatment room in the following fashion.

Figure 6:
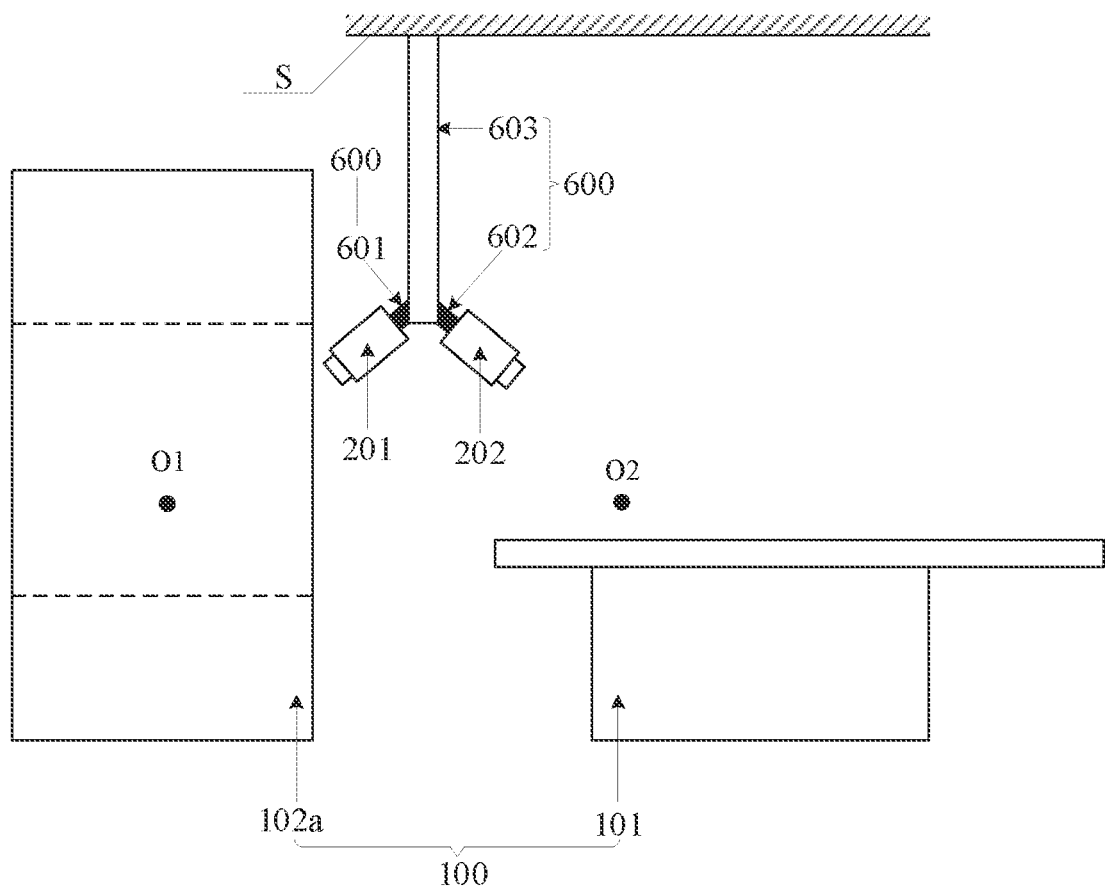
FIG. 6 is a schematic structural diagram of a radiotherapy monitoring system according to some embodiments of the present disclosure.

As shown in FIG. 6, FIG. 6 is a schematic structural diagram of a radiotherapy monitoring system according to some embodiments of the present disclosure. The radiotherapy monitoring system 000 further includes a fixed rod 600 in the treatment room in which the radiotherapy equipment 100 is disposed. The fixed rod 600 includes a first branch fixed rod 601 and a second branch fixed rod 602. The first branch fixed rod 601 faces the non-open gantry 102a and is connected to the first stereo camera 201, to allow the shooting direction of the first stereo camera 201 to face the interior area of the non-open gantry 102a. The second branch fixed rod 602 faces the support apparatus 101 and is connected to the second stereo camera 202, to allow the shooting direction of the second stereo camera 202 to face the support surface of the support apparatus 101.

The fixed rod 600 is a fixed rod with a fixed length or a telescopic rod with a variable length.

In some embodiments of the present disclosure, the fixed rod 600 further includes a connecting fixed rod 603. One end of the connecting fixed rod 603 is arranged in the reference plane S of the treatment room. An end, distal from the first stereo camera 201, of the first branch fixed rod 601 is fixedly connected to the connecting fixed rod 603. An end, distal from the second stereo camera 202, of the second branch fixed rod 602 is fixedly connected to the connecting fixed rod 603.

In some embodiments, the connecting fixed rod 603 is disposed between the non-open gantry 102a and the support apparatus 101 in the axial direction of the non-open gantry 102a. In this case, both the process of moving the patient onto the support apparatus 101 and the process of moving the patient away from the support apparatus 101 are performed when the support apparatus 101 is disposed outside the non-open gantry 102a. When the support apparatus 101 is disposed outside the non-open gantry 102a, the connecting fixed rod 603 is disposed between the non-open gantry 102a and the support apparatus 101 in the axial direction of the non-open gantry 102a. Therefore, in the process of moving the patient onto the support apparatus 101 or away from the support apparatus 101, there is a low probability that the patient collides with the first stereo camera 201 and the second stereo camera 202 on the connecting fixed rod 603. In this way, the connecting fixed rod 603 is a connecting rod with a fixed length.

To ensure that the first stereo camera 201 to which the first branch fixed rod 601 is connected can normally face the interior area of the non-open gantry 102a, a connection position of the first branch fixed rod 601 at the connecting fixed rod 603 needs to be closer to an end, distal from the reference plane S, of the connecting fixed rod 603. In this case, the distance between the first stereo camera 201 and the non-open gantry 102a is small, and the working distance of the first stereo camera 201 is less than or equal to the preset distance. That is, the first stereo camera 201 is a short-focus camera. In this way, it can be ensured that the second three-dimensional surface image acquired by the first stereo camera 201 has high imaging quality.

There are a plurality of cases for the mounting position of the second branch fixed rod 602 on the connecting fixed rod 603. The embodiments of the present disclosure are exemplarily described by taking the following two cases as examples.

In the first case, as shown in FIG. 6, the mounting position of the second branch fixed rod 602 on the connecting fixed rod 603 is closer to the end, distal from the reference plane S, of the connecting fixed rod 603. In this case, the distance between the second stereo camera 202 and the virtual isocenter O2 above the support surface of the support apparatus 101 is small, and the working distance of the second stereo camera 202 is less than or equal to the preset distance. That is, the second stereo camera 202 is a short-focus camera. In this way, it can be ensured that the first three-dimensional surface image acquired by the second stereo camera 202 has high imaging quality.

Figure 7:
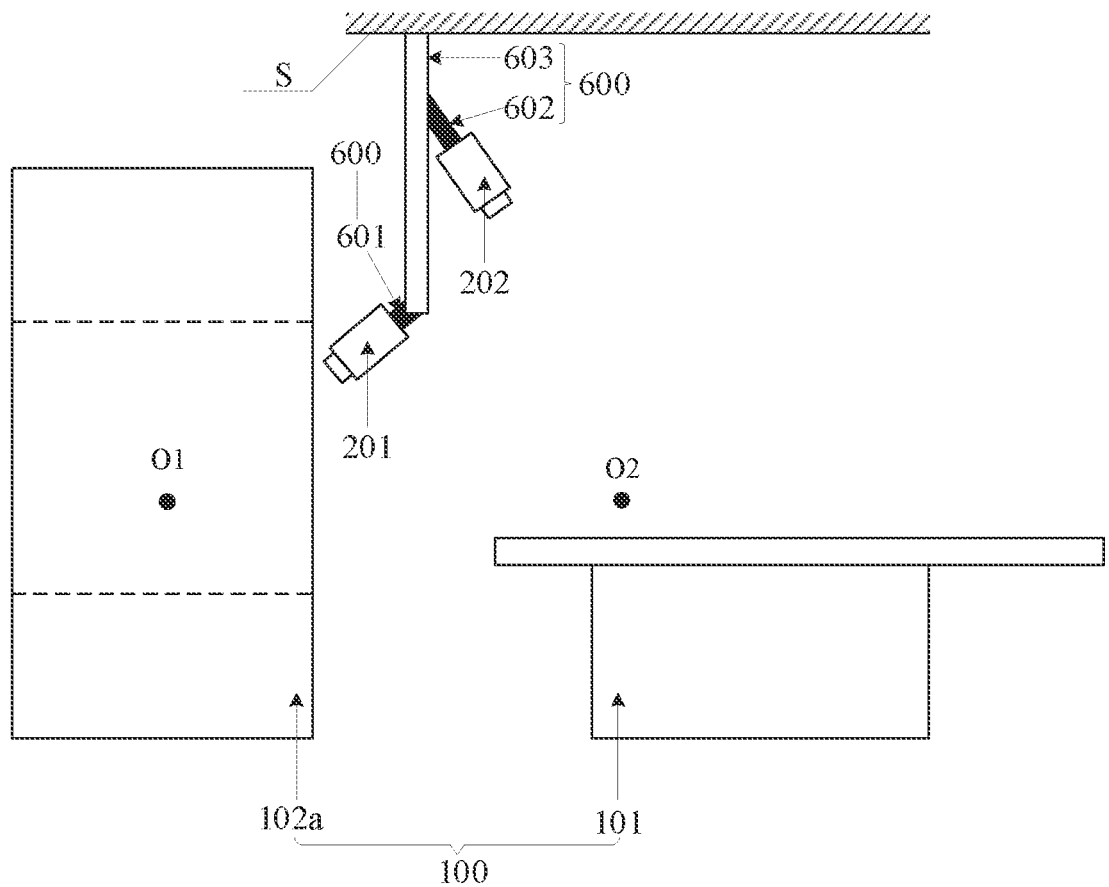
FIG. 7 is a schematic structural diagram of another radiotherapy monitoring system according to some embodiments of the present disclosure.

In the second case, as shown in FIG. 7. FIG. 7 is a schematic structural diagram of another radiotherapy monitoring system according to some embodiments of the present disclosure. The mounting position of the second branch fixed rod 602 on the connecting fixed rod 603 is closer to an end, proximal to the reference plane S, of the connecting fixed rod 603. In this case, the distance between the second stereo camera 202 and the virtual isocenter O2 above the support surface of the support apparatus 101 is large, and the working distance of the second stereo camera 202 is greater than the preset distance. That is, the second stereo camera 202 is a long-focus camera. In this way, it can be ensured that the first three-dimensional surface image acquired by the second stereo camera 202 has high imaging quality.

Figure 8:
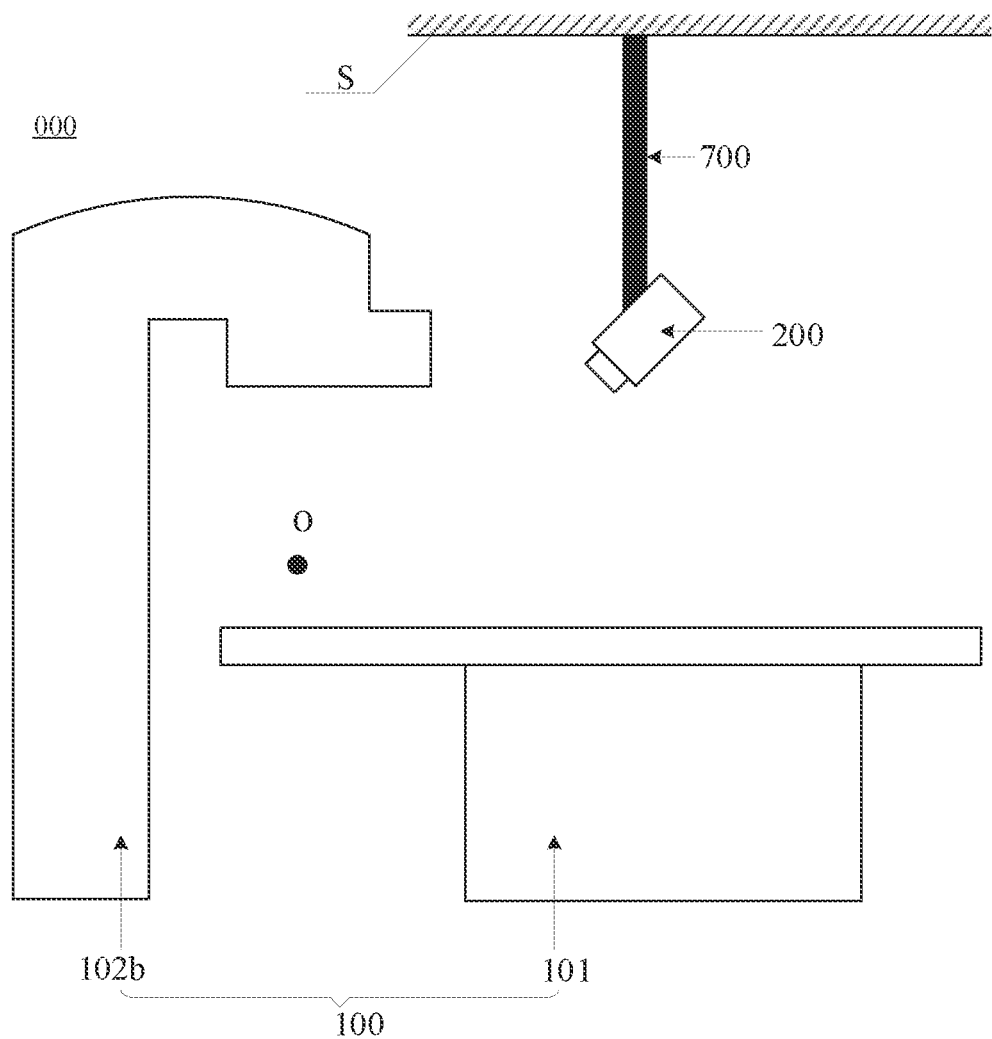
FIG. 8 is a schematic structural diagram of yet another radiotherapy monitoring system according to some embodiments of the present disclosure.

In the second optional embodiments, as shown in FIG. 8, FIG. 8 is a schematic structural diagram of yet another radiotherapy monitoring system according to some embodiments of the present disclosure. The rotating gantry in the radiotherapy equipment 100 is an open gantry 102b. The radiotherapy equipment 100 includes one isocenter O, and the isocenter O is usually disposed in a treatment area of the open gantry 102b.

In this case, one stereo camera 200 is provided in the radiotherapy monitoring system 000. The shooting direction of the stereo camera 200 faces the treatment area of the open gantry 102b, and the shooting range of the stereo camera 200 covers the isocenter O.

In some embodiments of the present disclosure, in a setup phase of the patient, that is, prior to treating the patient by the radiotherapy equipment 100, the first three-dimensional surface image of the patient is acquired by the stereo camera 200. In a process of controlling the movement of the patient by the support apparatus 101 of the radiotherapy equipment 100, the control apparatus monitors the movement of the patient based on the first three-dimensional surface image, until the target point of the patient after the movement is overlapped with the isocenter O of the radiotherapy equipment 100, such that the setup process of the patient can be completed. In a treatment phase of the patient, that is, in a process of treating the patient by the radiotherapy equipment 100, a second three-dimensional surface image of the patient is acquired again by using the stereo camera 200, and the control apparatus monitors the movement of the patient based on the second three-dimensional surface image, to prevent a radiation beam emitted by the radiotherapy equipment 100 from irradiating normal tissue of the patient.

In some embodiments, the radiotherapy monitoring system 000 further includes a connecting rod 700. One end of the connecting rod 700 is fixedly connected to the stereo camera 200, and the other end is fixedly connected to the reference plane S in the treatment room in which the radiotherapy equipment 100 is disposed. The stereo camera 200 is mounted by the connecting rod 700 in the treatment room in which the radiotherapy equipment 100 is disposed. For example, the reference plane S in the treatment room is a plane in which the ceiling of the treatment room is disposed or is a support surface for fixing other apparatuses.

The treatment area of the open gantry 102b is usually large. Therefore, even if the distance between the stereo camera 200 and the support surface of the support apparatus 101 is large, it can still be ensured that the shooting range of the stereo camera 200 can cover the isocenter O of the radiotherapy equipment 100. In this way, in the process of moving the patient onto the support apparatus 101 or away from the support apparatus 101, there is a low probability that the patient collides with the stereo camera 200. In addition, when the treatment area of the open gantry 102b is large, the distance between the stereo camera 200 and the isocenter O of the radiotherapy equipment is also large. Therefore, the working distance of the stereo camera 200 is large. For example, the working distance of the stereo camera 200 is greater than the preset distance. That is, the stereo camera 200 is a long-focus camera. In this way, it can be ensured that the first three-dimensional surface image and the second three-dimensional surface image acquired by the stereo camera 200 have high imaging quality.

In the embodiments of the present disclosure, the connecting rod 700 is a connecting rod with a fixed length or is a telescopic rod retractable in the length direction of the connecting rod 700. This is not limited in the embodiments of the present disclosure.

It should be noted that for the telescopic rod in the foregoing embodiments, the telescopic rod includes a rod-shaped valve body and a rod-shaped valve core. One end of the valve core is disposed in the valve body, and the other end of the calve core is disposed outside the valve body. The valve core is retractable in the valve body, to allow the length of the telescopic rod to change. The valve body is a pneumatic cylinder, a hydraulic cylinder, or the like. It should be noted that in other possible embodiments, the telescopic rod may be a telescopic rod of another type. For example, the telescopic rod may be formed by a plurality of slidable sub-connecting rods sleeved with each other. Therefore, the specific structure of the telescopic rod is not limited by the embodiments of the present disclosure.

In summary, the radiotherapy monitoring system provided in the embodiments of the present disclosure includes radiotherapy equipment and one or more stereo cameras. Prior to treating a patient, a first three-dimensional surface image of the patient is acquired by the one or more stereo cameras, such that the movement of the patient can be monitored based on the first three-dimensional surface image in a process of controlling the movement of the patient by a support apparatus of the radiotherapy equipment, to implement the setup of the patient. After the setup of the patient is completed, during the treating the patient by the radiotherapy equipment, a second three-dimensional surface image of the patient is acquired by the one or more stereo cameras, such that the movement of the patient is monitored based on the second three-dimensional surface image, to prevent a radiation beam emitted by the radiotherapy equipment from irradiating normal tissue of the patient. The setup of the patient and the monitoring of the position of the patient can be implemented without using an IGRT system including imaging equipment such as CT or CBCT equipment. Because the stereo camera produces no radiation during operation, a patient is exposed to a small amount of radiation, to achieve a better treatment effect of the patient by the radiotherapy monitoring system. In addition, the number of stereo cameras in the radiotherapy monitoring system needs to be the same as the number of isocenters of the radiotherapy equipment. Therefore, the number of stereo cameras in the radiotherapy monitoring system is small, and the manufacturing costs of the radiotherapy monitoring system are low.

The embodiments of the present disclosure further provide a method for controlling the radiotherapy monitoring system. The method is applicable to the radiotherapy monitoring system shown in FIG. 1, FIG. 2, FIG. 3, FIG. 4, FIG. 6, FIG. 7 or FIG. 8. The method includes the following steps.

In S1, prior to treating the patient by radiotherapy equipment, a first surface reference image of the patient is acquired by the one or more stereo cameras, and the movement of the patient is monitored based on the first surface reference image.

For example, before radiotherapy equipment in the radiotherapy monitoring system treats the patient, the control apparatus in the radiotherapy monitoring system acquires the first surface reference image of the patient by the one or more stereo cameras, and monitor the movement of the patient based on the first surface reference image.

In S2, during the treating the patient by the radiotherapy equipment in the radiotherapy monitoring system, a second surface reference image of the patient is acquired by the one or more stereo cameras, and the movement of the patient is monitored based on the second surface reference image.

For example, in the process of treating the patient by the radiotherapy equipment in the radiotherapy monitoring system, the control apparatus in the radiotherapy monitoring system acquires the second surface reference image of the patient by the one or more stereo cameras, and monitor the movement of the patient based on the second surface reference image.

Optionally, the method for controlling the radiotherapy monitoring system further includes: in response to receiving a user instruction for starting to monitor the movement of the patient, controlling the one or more stereo cameras to switch to a shooting started state; in response to receiving a user instruction for stopping monitoring of the movement of the patient, controlling the one or more stereo cameras to switch to a shooting stopped state; and in response to receiving a user instruction for pausing monitoring of the movement of the patient is received, controlling the stereo camera to switch to a shooting paused state.

For example, the control apparatus in the radiotherapy monitoring system receives different user instructions, such that the control apparatus can control the stereo camera to switch to different states based on the different user instructions. For example, the control apparatus is provided with different control buttons corresponding to the different user instructions. After an operator presses a control button, the control apparatus receives a control instruction corresponding the control button.

For example, when the control apparatus receives a user instruction used for starting to monitor the movement of the patient, the control apparatus controls the stereo camera to switch to a shooting started state, so that the stereo camera can acquire the first three-dimensional surface image or the second three-dimensional surface image of the patient. When the control apparatus receives a user instruction used for stopping monitoring the movement of the patient, the control apparatus controls the stereo camera to switch to a shooting stopped state, so that the stereo camera can stop acquiring the first three-dimensional surface image or the second three-dimensional surface image of the patient. When the control apparatus receives a user instruction used for pausing monitoring of the movement of the patient, the control apparatus controls the stereo camera to switch to a shooting paused state, so that the stereo camera can pause acquisition of the first three-dimensional surface image or the second three-dimensional surface image of the patient. In this way, during the treatment of the patient by the radiotherapy equipment, an operator triggers different user therapies, so that the control apparatus can control the stereo camera to enter different states, thereby facilitating the completion of a treatment process of the patient.

The embodiments of S1 above are different for radiotherapy monitoring systems of different types. For this, the implementation of the embodiments of the present disclosure is described by using the following two cases.

In the first case, in the case that the radiotherapy monitoring system is the radiotherapy monitoring system shown in FIG. 2, FIG. 3, FIG. 4, FIG. 6 or FIG. 7, S1 above includes: prior to treating the patient by the radiotherapy equipment, acquiring the first surface reference image of the patient by the second stereo camera in response to receiving the user instruction for starting to monitor the movement of the patient, to monitor the movement of the patient based on the first surface reference image.

In the second case, in the case that the radiotherapy monitoring system is the radiotherapy monitoring system shown in FIG. 8, S1 above includes: prior to treating the patient by the radiotherapy equipment, acquiring the first surface reference image of the patient by the stereo camera in response to receiving the user instruction for starting to monitor the movement of the patient, to monitor the movement of the patient based on the first surface reference image.

The embodiments of S2 above are different for radiotherapy monitoring systems of different types. For this, the implementation of the embodiments of the present disclosure is described by using the following three cases.

In the first case, in the case that the radiotherapy monitoring system is the radiotherapy monitoring system shown in FIG. 2, FIG. 3, FIG. 6 or FIG. 7, S2 above includes: during the treating the patient by the radiotherapy equipment, acquiring the second surface reference image of the patient by the first stereo camera in response to receiving the user instruction for starting to monitor the movement of the patient, to monitor the movement of the patient based on the second surface reference image.

In the second case, in the case that the radiotherapy monitoring system is the radiotherapy monitoring system shown in FIG. 4, S2 above includes: during the treating the patient by the radiotherapy equipment, controlling the first connecting member to stretch in the length direction of the first connecting member in response to receiving the user instruction for starting to monitor the movement of the patient, such that the first stereo camera can face the interior area of the non-open gantry. After the first connecting member has stretched, the second surface reference image of the patient is acquired by the first stereo camera, to monitor the movement of the patient based on the second surface reference image.

Next, in response to receiving the user instruction for stopping monitoring the movement of the patient, the first stereo camera is controlled to stop acquiring the second surface reference image, and the first connecting member is controlled to retract in the length direction of the first connecting member, such that the distance between the first stereo camera and the support surface of the support apparatus is large.

In the third case, in the case that the radiotherapy monitoring system is the radiotherapy monitoring system shown in FIG. 8, S2 above includes: during the treating the patient by the radiotherapy equipment, the second surface reference image of the patient is acquired by the stereo camera in response to receiving the user instruction for starting to monitor the movement of the patient, to monitor the movement of the patient based on the second surface reference image.

It should be noted that for the specific process and principle of the method for controlling the radiotherapy monitoring system provided in the foregoing embodiments, reference may be made to the foregoing embodiments of describing the structure of the radiotherapy monitoring system, which is not repeated here.

In the present disclosure, the terms "first" and "second" are used only for description, but are not intended to indicate or imply relative importance. The term "a plurality of" means two or more than two, unless otherwise clearly specified.

The foregoing are merely optional embodiments of the present utility model but are not used to limit the present utility model. Any changes, equivalent replacements, and improvements made within the spirit and principle of the present utility model shall fall within the protection scope of the present utility model.

What is claimed is:

1. A radiotherapy monitoring system, comprising:
radiotherapy equipment, wherein the radiotherapy equipment comprises a support apparatus for carrying a patient and is provided with one or more isocenters; and
one or more stereo cameras, wherein the one or more stereo cameras correspond to the one or more isocenters in a one-to-one correspondence, a shooting range of each stereo camera covers an isocenter corresponding to the stereo camera, and the one or more stereo cameras are configured to acquire three-dimensional surface images of the patient to monitor a movement of the patient based on the three-dimensional surface image;
wherein the radiotherapy equipment further comprises a non-open gantry, the one or more isocenters comprise an actual isocenter disposed in the non-open gantry and a virtual isocenter that is disposed outside the non-open gantry and is disposed above a support surface of the support apparatus, and there is a preset position relationship between the virtual isocenter and the actual isocenter; and
the one or more stereo cameras comprise a first stereo camera corresponding to the actual isocenter and a second stereo camera corresponding to the virtual isocenter, wherein a shooting direction of the first stereo camera faces an interior area of the non-open gantry, and the shooting range of the first stereo camera covers the actual isocenter; and a shooting direction of the second stereo camera faces the support surface of the support apparatus, and the shooting range of the second stereo camera covers the virtual isocenter.

2. The radiotherapy monitoring system according to claim 1, wherein the one or more stereo cameras are configured to acquire a first three-dimensional surface image of the patient prior to treating the patient by the radiotherapy equipment to monitor the movement of the patient based on the first three-dimensional surface image.

3. The radiotherapy monitoring system according to claim 1, wherein the one or more stereo cameras are configured to acquire a second three-dimensional surface image of the patient during treating the patient by the radiotherapy equipment to monitor the movement of the patient based on the second three-dimensional surface image.

4. The radiotherapy monitoring system according to claim 1, wherein the one or more stereo cameras are configured to acquire a first three-dimensional surface image of the patient prior to treating the patient by the radiotherapy equipment and acquire a second three-dimensional surface image of the patient during the treating the patient by the radiotherapy equipment to monitor the movement of the patient based on the first three-dimensional surface image and the second three-dimensional surface image.

5. The radiotherapy monitoring system according to claim 1, wherein the first stereo camera is closer to the non-open gantry than the second stereo camera is.

6. The radiotherapy monitoring system according to claim 5, wherein the first stereo camera is a short-focus stereo camera, and the second stereo camera is a long-focus stereo camera.

7. The radiotherapy monitoring system according to claim 6, wherein the first stereo camera is at least partially disposed outside the non-open gantry, and anyone of following conditions is satisfied:
the first stereo camera extends into the interior area of the non-open gantry from a front end surface of the non-open gantry; or
the first stereo camera extends into the interior area of the non-open gantry from a rear end surface of the non-open gantry.

8. The radiotherapy monitoring system according to claim 6, wherein the first stereo camera is completely disposed outside the non-open gantry, and anyone of following conditions is satisfied:
the shooting direction of the first stereo camera faces a front end surface of the non-open gantry; or
the shooting direction of the first stereo camera faces a rear end surface of the non-open gantry.

9. The radiotherapy monitoring system according to claim 6, wherein anyone of following conditions is satisfied:
the second stereo camera is disposed above the support apparatus; or
the second stereo camera is disposed at a tail portion of the support apparatus.

10. The radiotherapy monitoring system according to claim 1, wherein the first stereo camera is farther from the non-open gantry than the second stereo camera is.

11. The radiotherapy monitoring system according to claim 10, wherein the first stereo camera and the second stereo camera are both long-focus stereo cameras.

12. The radiotherapy monitoring system according to claim 1, further comprising a first connecting member connected to the first stereo camera and a second connecting member connected to the second stereo camera,
wherein the first connecting member is arranged at a first reference position in a treatment room in which the radiotherapy equipment is disposed, and the second connecting member is arranged at a second reference position in the treatment room.

13. The radiotherapy monitoring system according to claim 12, wherein the first connecting member is a telescopic rod.

14. The radiotherapy monitoring system according to claim 1, further comprising a fixed rod arranged in a reference plane in a treatment room in which the radiotherapy equipment is disposed, wherein the fixed rod comprises a first branch fixed rod and a second branch fixed rod, the first branch fixed rod faces the non-open gantry and is connected to the first stereo camera, and the second branch fixed rod faces the support apparatus and is connected to the second stereo camera.

15. The radiotherapy monitoring system according to claim 1, further comprising a control apparatus connected to the one or more stereo cameras and the radiotherapy equipment.

16. A method for controlling the radiotherapy monitoring system as defined in claim 1, comprising:
prior to treating the patient by radiotherapy equipment in the radiotherapy monitoring system, acquiring a first surface reference image of the patient by the one or more stereo cameras, and monitoring the movement of the patient based on the first surface reference image; and
during the treating the patient by the radiotherapy equipment, acquiring a second surface reference image of the patient by the one or more stereo cameras, and monitoring the movement of the patient based on the second surface reference image.

17. The method according to claim 16, further comprising:
in response to receiving a user instruction for starting to monitor the movement of the patient, controlling the one or more stereo cameras to switch to a shooting started state;
in response to receiving a user instruction for stopping monitoring of the movement of the patient, controlling the one or more stereo cameras to switch to a shooting stopped state; and
in response to receiving a user instruction for pausing monitoring of the movement of the patient, controlling the one or more stereo cameras to switch to a shooting paused state.

* * * * *